US006215915B1

(12) United States Patent
Reyzin

(10) Patent No.: US 6,215,915 B1
(45) Date of Patent: Apr. 10, 2001

(54) IMAGE PROCESSING METHODS AND APPARATUS FOR SEPARABLE, GENERAL AFFINE TRANSFORMATION OF AN IMAGE

(75) Inventor: Igor Reyzin, Brookline, MA (US)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 09/027,432

(22) Filed: Feb. 20, 1998

(51) Int. Cl.[7] ....................................... G06K 9/32
(52) U.S. Cl. ..................... 382/296; 382/276; 345/436
(58) Field of Search ............................... 382/296, 276, 382/295, 300, 277; 345/436, 437, 438, 432, 475

(56) References Cited

U.S. PATENT DOCUMENTS

| | | | |
|---|---|---|---|
| 3,816,722 | 6/1974 | Sakoe et al. | 235/152 |
| 3,936,800 | 2/1976 | Ejiri et al. | 382/205 |
| 3,967,100 | 6/1976 | Shimomura | 708/446 |
| 3,968,475 | 7/1976 | McMahon | 382/124 |
| 3,978,326 | 8/1976 | Shimomura | 708/446 |
| 4,011,403 | 3/1977 | Epstein et al. | 348/370 |
| 4,115,702 | 9/1978 | Nopper | 250/559.2 |
| 4,115,762 | 9/1978 | Akiyama et al. | 382/151 |
| 4,183,013 | 1/1980 | Agrawala et al. | 382/173 |
| 4,200,861 | 4/1980 | Hubach et al. | 382/216 |
| 4,254,400 | 3/1981 | Yoda et al. | 382/194 |
| 4,300,164 | 11/1981 | Sacks | 348/251 |
| 4,385,322 | 5/1983 | Hubach et al. | 348/243 |
| 4,441,124 | 4/1984 | Heebner et al. | 348/126 |
| 4,441,206 | 4/1984 | Kuniyoshi et al. | 382/287 |

(List continued on next page.)

FOREIGN PATENT DOCUMENTS

| | | |
|---|---|---|
| 0 527 632 A2 | 2/1993 | (EP) . |
| WO 95/122137 | 8/1995 | (WO) . |
| WO 95/21376 | 8/1995 | (WO) . |
| WO 97/21189 | 6/1997 | (WO) . |
| WO 97/22858 | 6/1997 | (WO) . |
| WO 97/24692 | 7/1997 | (WO) . |
| WO 97/24693 | 7/1997 | (WO) . |

OTHER PUBLICATIONS

Convolution–based Interpolation for Fast, High–Quality Rotation of Images, IEEE Trans. Image Processing, vol. 4, pp. 1371–1381, Oct. 1995.

Cubic Convolution Interpolation for Digital Image Processing, IEEE Trans. Acoust., Speech, Signal Processing, vol. ASSP–29, pp. 1153–1160, Dec. 1981.

Cognex 3000/4000/5000, Programmable Vision Engines, Image Processing R7.4, pp. 86–87.

Grimson, W. Eric L. and Huttenlocher, Daniel P., "On the Sensitivity of the Hough Transform for Object Recognition", May 1990, IEEE Transactions on Pattern Analysis and Machine Intelligence, vol. 12, No. 3.

Medina–Mora et al. (1981) An Incremental Programming Environment, IEEE Transactions on Software Eng. SE–7:472–482.

(List continued on next page.)

Primary Examiner—Bhavesh Mehta
Assistant Examiner—Kanji Patel
(74) Attorney, Agent, or Firm—David J. Powsner; Russ Weinzimmer

(57) ABSTRACT

A separable, general affine transformation according to the invention permits an image to be concurrently rotated, scaled, translated, skewed, sheared, or otherwise transformed via a sequence of one-dimensional transformations. A general affine transformation of an image in two dimensions is achieved by generating an "intermediate" image via affine transformation of the source along a first axis. The intermediate image is then subjected to affine transformation along a second axis, e.g., perpendicular to the first. The resultant image may be used in place of that which would be produced by a single two-dimensional transformation of the source image (e.g., in a single pass).

39 Claims, 5 Drawing Sheets

U.S. PATENT DOCUMENTS

| | | | |
|---|---|---|---|
| 4,534,813 | 8/1985 | Williamson et al. | 156/212 |
| 4,541,116 | 9/1985 | Lougheed | 382/303 |
| 4,570,180 | 2/1986 | Baier et al. | 382/145 |
| 4,577,344 | 3/1986 | Warren et al. | 382/100 |
| 4,581,762 | 4/1986 | Lapidus et al. | 382/263 |
| 4,606,065 | 8/1986 | Beg et al. | 382/170 |
| 4,617,619 | 10/1986 | Gehly | 382/302 |
| 4,630,306 | 12/1986 | West et al. | 382/197 |
| 4,631,750 * | 12/1986 | Gabriel | 382/41 |
| 4,688,088 | 8/1987 | Hamazaki et al. | 348/94 |
| 4,706,168 | 11/1987 | Weisner | 362/18 |
| 4,728,195 | 3/1988 | Silver | 356/394 |
| 4,730,260 | 3/1988 | Mori et al. | 345/435 |
| 4,731,858 | 3/1988 | Grasmueller et al. | 382/151 |
| 4,736,437 | 4/1988 | Sacks et al. | 382/216 |
| 4,742,551 | 5/1988 | Deering | 382/170 |
| 4,764,870 | 8/1988 | Haskin | 348/443 |
| 4,771,469 | 9/1988 | Wittenburg | 382/203 |
| 4,783,826 | 11/1988 | Koso | 382/147 |
| 4,783,828 | 11/1988 | Sadjadi | 382/170 |
| 4,783,829 | 11/1988 | Miyakawa et al. | 382/199 |
| 4,831,580 | 5/1989 | Yamada | 345/433 |
| 4,860,374 | 8/1989 | Murakami et al. | 382/151 |
| 4,860,375 | 8/1989 | McCubbrey et al. | 382/303 |
| 4,876,457 | 10/1989 | Bose | 250/559.05 |
| 4,876,728 | 10/1989 | Roth | 382/153 |
| 4,903,218 | 2/1990 | Longo et al. | 345/332 |
| 4,907,169 | 3/1990 | Lovoi | 706/259 |
| 4,914,553 | 4/1990 | Hamada et al. | 362/560 |
| 4,922,543 | 5/1990 | Ahlbom et al. | 382/291 |
| 4,926,492 | 5/1990 | Tanaka et al. | 382/168 |
| 4,932,065 | 6/1990 | Feldgajer | 382/177 |
| 4,953,224 | 8/1990 | Ichinose et al. | 382/149 |
| 4,955,062 | 9/1990 | Terui | 382/144 |
| 4,959,898 | 10/1990 | Landman et al. | 29/705 |
| 4,962,423 | 10/1990 | Yamada et al. | 382/144 |
| 4,972,359 | 11/1990 | Silver et al. | 708/404 |
| 4,982,438 | 1/1991 | Usami et al. | 382/154 |
| 5,012,402 | 4/1991 | Akiyama | 700/87 |
| 5,046,190 | 9/1991 | Daniel et al. | 382/303 |
| 5,054,096 | 10/1991 | Beizer | 382/305 |
| 5,060,276 | 10/1991 | Morris et al. | 382/151 |
| 5,063,608 | 11/1991 | Siegel | 382/239 |
| 5,073,958 | 12/1991 | Imme | 382/267 |
| 5,081,656 | 1/1992 | Baker et al. | 378/21 |
| 5,081,689 | 1/1992 | Meyer et al. | 382/199 |
| 5,086,478 | 2/1992 | Kelly-Mahaffey et al. | 382/151 |
| 5,090,576 | 2/1992 | Menten | 209/587 |
| 5,091,861 | 2/1992 | Geller et al. | 700/192 |
| 5,091,968 | 2/1992 | Higgins et al. | 382/220 |
| 5,093,867 | 3/1992 | Hori et al. | 382/141 |
| 5,113,565 | 5/1992 | Cipolla et al. | 29/25.01 |
| 5,115,309 | 5/1992 | Hang | 348/388 |
| 5,119,435 | 6/1992 | Berkin | 382/145 |
| 5,124,622 | 6/1992 | Kawamura et al. | 318/569 |
| 5,133,022 | 7/1992 | Weideman | 382/172 |
| 5,134,575 | 7/1992 | Takagi | 382/147 |
| 5,143,436 | 9/1992 | Baylor et al. | 362/582 |
| 5,145,432 | 9/1992 | Midland et al. | 445/3 |
| 5,151,951 | 9/1992 | Ueda et al. | 382/156 |
| 5,153,925 | 10/1992 | Tanioka et al. | 382/272 |
| 5,159,281 | 10/1992 | Hedstrom et al. | 329/312 |
| 5,159,645 | 10/1992 | Kumagai | 382/198 |
| 5,164,994 | 11/1992 | Bushroe | 382/150 |
| 5,168,269 | 12/1992 | Harlan | 345/145 |
| 5,175,808 * | 12/1992 | Sayre | 395/133 |
| 5,185,855 | 2/1993 | Kato et al. | 345/429 |
| 5,189,712 | 2/1993 | Kajiwara et al. | 382/221 |
| 5,206,820 | 4/1993 | Ammann et al. | 702/185 |
| 5,216,503 | 6/1993 | Paik | 348/390 |
| 5,225,940 | 7/1993 | Ishii et al. | 359/823 |
| 5,230,027 | 7/1993 | Kikuchi | 382/147 |
| 5,243,607 | 9/1993 | Masson et al. | 714/49 |
| 5,253,306 | 10/1993 | Nishio | 382/112 |
| 5,253,308 | 10/1993 | Johnson | 382/304 |
| 5,265,173 | 11/1993 | Griffin et al. | 382/103 |
| 5,271,068 | 12/1993 | Ueda et al. | 382/216 |
| 5,287,449 | 2/1994 | Kojima | 345/161 |
| 5,297,256 | 3/1994 | Wolstenholme et al. | 702/183 |
| 5,299,269 | 3/1994 | Gaborski et al. | 382/156 |
| 5,311,598 | 5/1994 | Bose et al. | 382/149 |
| 5,315,388 | 5/1994 | Shen et al. | 348/718 |
| 5,319,457 | 6/1994 | Nakahashi et al. | 348/387 |
| 5,327,156 | 7/1994 | Masukane et al. | 345/113 |
| 5,337,267 | 8/1994 | Colavin | 708/606 |
| 5,363,507 | 11/1994 | Nakayama et al. | 345/331 |
| 5,367,439 | 11/1994 | Mayer et al. | 362/551 |
| 5,367,667 | 11/1994 | Wahlquist et al. | 714/32 |
| 5,371,690 | 12/1994 | Engel et al. | 382/151 |
| 5,388,197 | 2/1995 | Rayner | 345/328 |
| 5,388,252 | 2/1995 | Dreste et al. | 714/46 |
| 5,398,292 | 3/1995 | Aoyama | 382/199 |
| 5,432,525 | 7/1995 | Maruo et al. | 345/2 |
| 5,440,699 | 8/1995 | Farrand et al. | 345/329 |
| 5,455,870 | 10/1995 | Sepai et al. | 382/147 |
| 5,455,933 | 10/1995 | Schieve et al. | 714/27 |
| 5,475,766 | 12/1995 | Tsuchiya et al. | 382/144 |
| 5,475,803 * | 12/1995 | Stearns et al. | 395/136 |
| 5,477,138 | 12/1995 | Efjavic et al. | 324/158.1 |
| 5,481,712 | 1/1996 | Silver et al. | 717/1 |
| 5,485,570 | 1/1996 | Bushboom et al. | 345/329 |
| 5,491,780 | 2/1996 | Fyles et al. | 345/332 |
| 5,495,424 | 2/1996 | Tokura | 702/82 |
| 5,495,537 | 2/1996 | Bedrosian et al. | 382/209 |
| 5,519,840 | 5/1996 | Matias et al. | 707/101 |
| 5,526,050 | 6/1996 | King et al. | 348/387 |
| 5,532,739 | 7/1996 | Garakani et al. | 348/87 |
| 5,550,763 | 8/1996 | Michael | 702/155 |
| 5,566,877 | 10/1996 | McCormack | 228/105 |
| 5,568,563 | 10/1996 | Tanaka et al. | 382/144 |
| 5,574,668 | 11/1996 | Beaty | 702/150 |
| 5,574,801 | 11/1996 | Collet-Beillon | 382/150 |
| 5,583,949 | 12/1996 | Smith et al. | 382/199 |
| 5,583,954 | 12/1996 | Garakani | 382/278 |
| 5,592,562 | 1/1997 | Rooks | 382/150 |
| 5,594,859 | 1/1997 | Palmer et al. | 345/330 |
| 5,602,937 | 2/1997 | Bedrosian et al. | 382/151 |
| 5,608,872 | 3/1997 | Schwartz et al. | 709/205 |
| 5,640,199 | 6/1997 | Garakani et al. | 348/87 |
| 5,640,200 | 6/1997 | Michael | 348/87 |
| 5,649,032 * | 7/1997 | Burt et al. | 382/284 |
| 5,715,385 * | 2/1998 | Stearns et al. | 395/136 |

OTHER PUBLICATIONS

Teitelbaum et al. (19810 The Cornell Program Synthesizer: A Syntax–Directed Programming Environment, Communications of the ACM 24:563–573.

Newsletter from Acquity Imaging, Inc., "Remote Vision Support Package—The Phones Are Ringing!, " 1 page.

PictureTel Corporation Product Brochure "PictureTel Live PCS 100(tm) Personal Visual Communications System," 3pp. (1993).

PictureTel Corporation Product Brochure "PictureTel System 1000: Complete VideoConferencing For Cost Sensitive Applications," 4 pp. (1993).

PictureTel Corporation Product Brochure, "PictureTel System 4000(tm) A Family of Models to Fit Your Application From Offices to Boardrooms, Classrooms, and Auditoriums," 4 pp. (1993).

Symantec Corporation, "The Norton pcAnywhere User's Guide," Table of Contents 8 pp; Introduction of pcAnywhere Technology pp i–vii; Chapter 7—Sessions; pp. 191–240 (1991).

Bursky, Dave, "CMOS Four–Chip Set Process Images at 20–MHz Data Rates," Electronic Design, May 28, 1987, pp. 39–44.

Plessey Semiconductors, Preliminary Information, May 1986, Publication No. PS2067, May 1986, pp. 1–5.

NEC Electronics Inc., PD7281 Image Pipelined Processor, Product Information Brochure, pp. 2–169–2–211.

Horn, Berthold Klaus Paul. "Robot Vision", The Massachusetts Institute for Technology, 1986.

Rosenfeld, Azriel. "Computer Vision: Basic Principles," Proceedings of the IEEE. vol. 76, No. 8, Aug. 1988. pp. 863–868.

Pratt, William K., "Digital Image Processing", Second Edition, Chapter 14—Geometrical Image Modification; pp. 421–445; (1991) John Wiley & Sons, Inc.

* cited by examiner

IMAGE PROCESSING METHODS AND APPARATUS FOR SEPARABLE, GENERAL AFFINE TRANSFORMATION OF AN IMAGE

RESERVATION OF COPYRIGHT

The disclosure of this patent document contains material that is subject to copyright protection. The owner thereof has no objection to facsimile reproduction by anyone of the patent document or the patent disclosure, as it appears in the U.S. Patent and Trademark Office patent file or records, but otherwise reserves all copyright rights whatsoever.

BACKGROUND OF THE INVENTION

The human mind is uncannily adept at identifying patterns and images. It can readily recognize most objects, regardless of how they are oriented. Thus, even those young of years or lacking in mental capacity can recognize a familiar piece of candy at any angle of presentation.

What comes to the mind so easily can be painstakingly difficult to teach a computer. Machine vision is one example. Software engineers have long labored to program these machines to identify objects in digital images. Though these efforts have paid off, the going has been slow. It is fair to estimate that billions of lines of programming instructions have been thrown away in the effort.

Discarded along the way were the early machine vision programs that were each written for a specific application. These programs were abandoned as modular programming came to the fore. Software engineering, in general, and machine vision, in particular, benefitted from the new thinking. Libraries were developed containing hundreds of small, reusable image analysis algorithms that could be invoked on a mix-and-match basis. Relying on these, software engineers began to construct shorter, more reliable and more easily debugged programs.

Common to these libraries is the so-called affine transformation tool, which resizes and rotates images. It is typically used in preprocessing, to prepare an image for automated analysis by other machine vision tools.

Affine transforms can be used, for example, to simplify the recognition of part numbers stamped on articles on a conveyor belt. Once the overall position and orientation of each part is determined, e.g., using coarse image processing techniques, an affine transform is applied to "artificially" rotate and size the region expected to contain the stamping. That portion of the image can then be interpreted through the use of character recognition software. The use of an affine transform in this manner is preferable, for example, to physically moving and reorienting the article, e.g., with a robotic arm.

Conventional prior art techniques suggest that affine transforms can be accomplished by mapping a source image into a destination image in a single pass. For every pixel location in the destination image, a corresponding location in the source image is identified. In a simplistic example, every pixel coordinate position in the destination image maps directly to an existing pixel in the source. Thus, for example, the pixel at coordinate (4,10) in the source maps to coordinate (2,5) in the destination; the pixel at (6,10) in the source, to (3,5) in the destination; and so on.

Reality is not so easy. Rarely do pixels in the source map directly to pixel positions in the destination. Thus, for example, a pixel at coordinate (4,10) in the source may map to a location (2.5, 5.33) in the destination. This can be problematic insofar as it requires interpolation to determine appropriate pixel intensities for the mapped coordinates. In the example, an appropriate intensity might be determined as a weighted average of the intensities for the source pixel locations (2,5), (3,5), (2,6), and (3,6).

The interpolation of thousands of such points is time consuming, even for a computer. Conventional affine transform tools must typically examine at least four points in the source image to generate each point in the destination image. This is compounded for higher-order transformations, which can require examination of many more points for each interpolation.

Although prior art has suggested the use of multiple passes (i.e., so-called separable techniques) in performing specific transformations, such as rotation, no suggestion is made as to how this might be applied to general affine transforms, e.g., involving simultaneous rotation, scaling, and skew.

Accordingly, an object of this invention is to provide improved systems for image processing and, more particularly, improved methods and apparatus for general affine transformation, e.g., for the simultaneous rotation, translation and scaling of images.

Another object of the invention is to provide such methods and apparatus as permit rapid analysis of images, without undue consumption of resources.

Still another object of the invention is to provide such methods and apparatus as are readily adapted to implementation conventional digital data processing apparatus, e.g., such as those equipped with commercially available super-scalar processors—such as the Intel Pentium MMX or Texas Instruments C80 microprocessors.

SUMMARY OF THE INVENTION

The foregoing objects are among those attained by the invention, which provides methods and apparatus for separable, general affine transformation. Thus, the invention permits an image to be concurrently rotated, scaled, translated, skewed, sheared, or otherwise transformed via a sequence of one-dimensional transformations (or passes). In an exemplary aspect, the invention provides methods for general affine transformation of an image in two dimensions by generating an "intermediate" image via affine transformation of the source along a first axis. The intermediate image is then subjected to affine transformation along a second axis, e.g., perpendicular to the first. The resultant image may be used in place of that which would be produced by a single two-dimensional transformation of the source image (e.g., in a single pass).

According to related aspects of the invention, there are provided methods as described above in which the first one-dimensional transformation determines a mapping between coordinates in the intermediate image and those in the source image. Preferably, the coordinates in the intermediate image lie at integer coordinate positions, e.g., coordinate positions such as at (1, 1), (1, 2), and so forth. Though the mapped locations in the source image do not necessarily lie at integer coordinate positions, they advantageously include at least one integer coordinate, e.g., coordinate positions such as (1, 1.5), (2, 4.25), (3, 3.75), and so forth.

Once the mappings of the first one-dimensional transformation are determined (or after each one has been determined), the method determines an intensity value for the pixel at each coordinate in the intermediate image. This is done by interpolating among the intensities of the pixels in the region neighboring the corresponding or mapped coordinate in the source image. Because the coordinate locations in the intermediate image are generated in sequences along a first axis, and because the mapped locations have at least one integer coordinate, interpolations are greatly simplified.

With the second one-dimensional transformation, the method similarly determines a mapping between pixel coordinates in a destination image and those of the intermediate image. This transformation proceeds as described above, albeit with sequences of coordinate locations that vary along a second axis, e.g., orthogonal to the first.

According to further aspects of the invention, general affine transformations are effected in accord with the mathematical relation:

$$\begin{bmatrix} x_s \\ y_s \end{bmatrix} = M \cdot \begin{bmatrix} x_d \\ y_d \end{bmatrix} + \begin{bmatrix} x_o \\ y_o \end{bmatrix}$$

$$M = \begin{bmatrix} e_{11} & e_{12} \\ e_{21} & e_{22} \end{bmatrix}$$

where ($x_d$, $y_d$) represents a coordinate in the destination image;
($x_s$, $y_s$) represents a coordinate in the source image;
($x_o$, $y_o$) is an offset to be effected by the transformation; and
M is a transformation matrix.

According to further aspects of the invention, the transformation matrix M is decomposed into left and right triangular matrices (otherwise referred to as upper and lower matrices, U and L, respectively) in accord with the following mathematical relation:

$$M = L \cdot U$$

$$\begin{bmatrix} e_{11} & e_{12} \\ e_{21} & e_{22} \end{bmatrix} = \begin{bmatrix} l_{11} & 0 \\ l_{21} & l_{22} \end{bmatrix} \cdot \begin{bmatrix} u_{11} & u_{12} \\ 0 & u_{22} \end{bmatrix}$$

In a related aspect of the invention, the matrix elements $l_{11}$ and $u_{22}$ are set to integers, and, preferably, are set to one.

In accordance with related aspects of the invention, a method as described above forms the first transformation, or first "pass," in accord with the mathematical relation:

$$\begin{bmatrix} x_t \\ y_t \end{bmatrix} = \begin{bmatrix} u_{11} & u_{12} \\ 0 & u_{22} \end{bmatrix} \begin{bmatrix} x_s \\ y_s \end{bmatrix} + \begin{bmatrix} INT(x_o) \\ y_o \end{bmatrix}$$

where ($x_s$ $y_s$) is a coordinate in the source image;
($x_t$ $y_t$) is a coordinate in the intermediate image;
($x_o$ $y_o$) is a translational offset to be effected by the transformation;
INT($x_o$) is the integer component of $x_o$; and $$\begin{bmatrix} u_{11} & u_{12} \\ 0 & u_{22} \end{bmatrix}$$

is the upper partial transformation matrix attained by decomposition of the transformation matrix M.

In a related aspect, the second partial transformation, or second "pass" is effected in accord with the mathematical relation:

$$\begin{bmatrix} x_t \\ y_t \end{bmatrix} = \begin{bmatrix} l_{11} & 0 \\ l_{21} & l_{22} \end{bmatrix} \begin{bmatrix} x_t \\ y_t \end{bmatrix} + \begin{bmatrix} FRAC(x_o) \\ 0 \end{bmatrix}$$

where ($x_t$, $y_t$) is a coordinate in the intermediate image;
($x_d$ $y_d$) is a coordinate in the destination image;
($x_o$) is the x-axis component of the offset to be effected by the transformation;
FRAC($x_0$) is the fractional component of $x_0$; and $$\begin{bmatrix} l_{11} & 0 \\ l_{21} & l_{22} \end{bmatrix}$$

is a lower partial transformation matrix attained by decomposition of the transformation matrix M.

Still further aspects of the invention provide methods as described above in which the mappings between pixel coordinates in the source and intermediate images are determined iteratively. Thus, for example, once a mapping has been determined for one coordinate in the intermediate image, a mapping for the next coordinate is obtained as a function (e.g., summation) of the prior mapping. For example, on determining the x-axis coordinate of a coordinate in the source image that maps to a coordinate in the intermediate image, the x-axis coordinate that maps to the adjacent coordinate in the intermediate image may be obtained using the relation:

$$x_s[i+1, j] = x_s[i, j] + 1$$

where $x_s[i, j]$ is the x-axis coordinate of a location in the source image that maps to coordinate (i, j) in the intermediate image;
$x_s[i+1, j]$ is the x-axis coordinate of the location in the source image that maps to coordinate (i+1, j) in the intermediate image.

Likewise, the y-axis coordinate of a location in the source image can be determined iteratively in accord with the following relation:

$$y_s[i+1, j] = y_s[i, j] + l_{21}$$

where $y_s[i, j]$ is the y-axis coordinate of a location in the source image that maps to coordinate (i, j) in the intermediate image;
$y_s[i+1, j]$ is the y-axis coordinate of the location in the source image that maps to coordinate (i+1, j) in the intermediate image;
$l_{21}$ is a parameter from the lower partial transformation matrix, as described above.

In a related aspect, the invention provides methods as described above in which the mapping between coordinates in the intermediate image and the destination image are determined in accord with the iterative relations:

$$x_t[i+1, j] = x_t[i, j] + u_{11}$$

$$y_t[i+1, j] = y_t[i, j] + 1$$

where $x_t[i, j]$ is the x-axis coordinate of a location in the intermediate image that maps to coordinate (i, j) in the destination image;

$x_s[i+1, j]$ is the x-axis coordinate of a location in the intermediate image that maps to coordinate (i+1, j) in the destination image;

$y_s[i, j]$ is the y-axis coordinate of a location in the intermediate image that maps to coordinate (i, j) in the destination image;

$y_s[i+1, j]$ is the y-axis coordinate of a location in the intermediate image that maps to coordinate (i+1, j) in the destination image.

Still further aspects of the invention provide methods as described above in which the first partial transformation determines mappings between the intermediate and source images for only those coordinates in the intermediate image that will ultimately be mapped into the destination image. Put another way, rather than mapping the entire region of the source image that lies within the bounding box enclosing the intermediate affine "rectangle," methods according to this aspect of the invention map only those portions that lie within the destination image.

Rather than determining a source-to-intermediate mapping for each pixel coordinate in a row of the intermediate image, a method according to this aspect of the invention can limit those determinations to the region in each row that is offset from the prior row by an amount $u_{12}$, which is a parameter of the upper partial transformation matrix as defined above.

More particularly, having determined the x-axis coordinate of a location in the source image that maps to the first element (0, j) in a row of the intermediate image, a method according to this aspect of the invention can determine the x-axis coordinate of a location in the source image that maps to the first element (0, j+1) in the next row of the intermediate image in accord with the relation:

$$x_s[0, j+1] = x_s[0, j] + u_{12}$$

Still further aspects of the invention provide methods as described above utilizing modified forms of the foregoing mathematical relations in order to effect affine transforms for angles outside the range −45°–45°.

Yet still other aspects of the invention provide digital data processing apparatus, e.g., machine vision systems operating in accord with the above-described methodologies.

Those and other aspects of the invention are evident in the drawings and in the description that follows.

Methods and apparatus according to the invention have many advantages over prior art affine transformation techniques. In the case of bilinear transformations, the invention is advantageous insofar as it demands fewer pipeline stages to resolve data dependicies during interpolation—and, therefore, permits better utilization of superscalar processor execution units. In addition, the invention permits processor registers to be used more efficiently, e.g., because linear interpolations require fewer computations than bilinear interpolations.

In the case of higher-order interpolations, the invention is advantageous because it demands fewer operations. Particularly, the number of operations required by the prior art is proportional to $n^2$, where (n) is the order of interpolation. The number of operations required by the invention, on the other hand, is proportional to $2n$.

The invention also has other advantages over the prior art. Specifically, although separable transformation techniques are known, they cannot be applied to general affine transformation but, only to individual transformations, e.g., rotation-only, scaling-only, etc. Thus, for example, in order to rotate, scale and skew an image using these prior art techniques, it is necessary to do three separate transformations (each requiring at least two passes). The invention permits this to be accomplished and in a single, two-part transformation.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Figure 1:
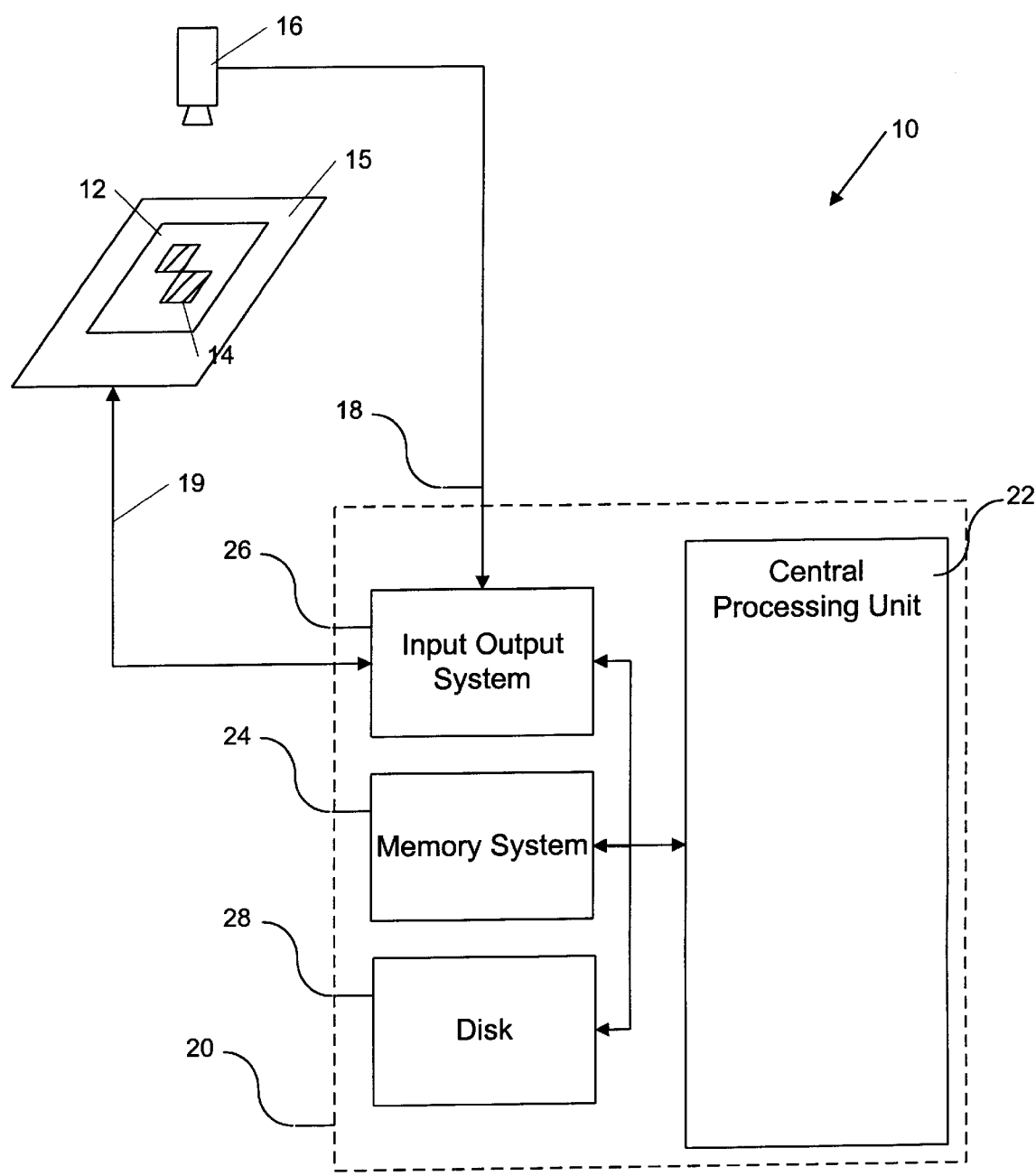
FIG. 1 depicts a digital data processing system for general affine transformation according to the invention.

FIG. 1 depicts a machine vision system 10 according to the invention for generating an affine transformation of a source image. The system 10 includes an image capture device, e.g., camera 16, that generates an image of a scene including object 12. Digital image data (or pixels) generated by the capturing device 16 represents, in the conventional manner, the image intensity (e.g., contrast color, brightness) of each point in the field of view of the capturing device. The image acquisition device may be video camera, charge coupled display (CCD) device, or any other device suitable for imaging device object 12. In the illustration, the object 12 is disposed on a platform 15 capable of translating and rotating the object, e.g., based on information determined by image analysis system 20 in connection with the transformations described herein.

Digital image data is transmitted from capturing device 16 via a communications path 18 to the image analysis system 20. This can be a conventional digital data processor, or a vision processing system of the type commercially available from the assignee hereof, Cognex Corporation, as programmed in accord with the teachings hereof to rotate, scale and translate an image acquired by device 16. The image analysis system 20 may have one or more central processing units 22, main memory 24, input-output system 26, and disk drive (or other mass storage device) 28, all of the conventional type. A preferred central processing unit for use in carrying out methods according to the invention has a superscalar instruction set, e.g., those of the Intel Me or Texas Instruments C80 processors.

The system 20 and, more particularly, central processing unit 22, is configured by programming instructions according to teachings hereof for operation as further described and illustrated herein. Those skilled in the art will appreciate that, in addition to implementation on a programmable digital data processor, the methods taught herein can be implemented in special purpose hardware.

By way of background, affine is generally accomplished by mapping source image coordinates to destination image coordinates and, based on those mappings, interpolating among source image pixel intensities to estimate appropriate densities for the destination image. This can be expressed mathematically as follows:

$$\begin{bmatrix} x_s \\ y_s \end{bmatrix} = M \cdot \begin{bmatrix} x_d \\ y_d \end{bmatrix} + \begin{bmatrix} x_o \\ y_o \end{bmatrix}$$

where
- $(x_s, y_s)$ is a coordinate in the source image;
- $(x_d, y_d)$ is a coordinate in the destination image;
- $(x_o, y_o)$ is an offset defining the extent to which the source image is to be translated; and
- M is a transformation matrix defining the extent to which the source image is to be rotated, scaled, skewed or otherwise transformed by the transformation.

According to prior art techniques, solution of this relation typically results in non-integer mappings in both x- and y-dimensions. Because this necessitates mathematically intensive interpolations in two-dimensions, intensities for the destination image cannot be iteratively solved without undue consumption of resources.

Figure 2:
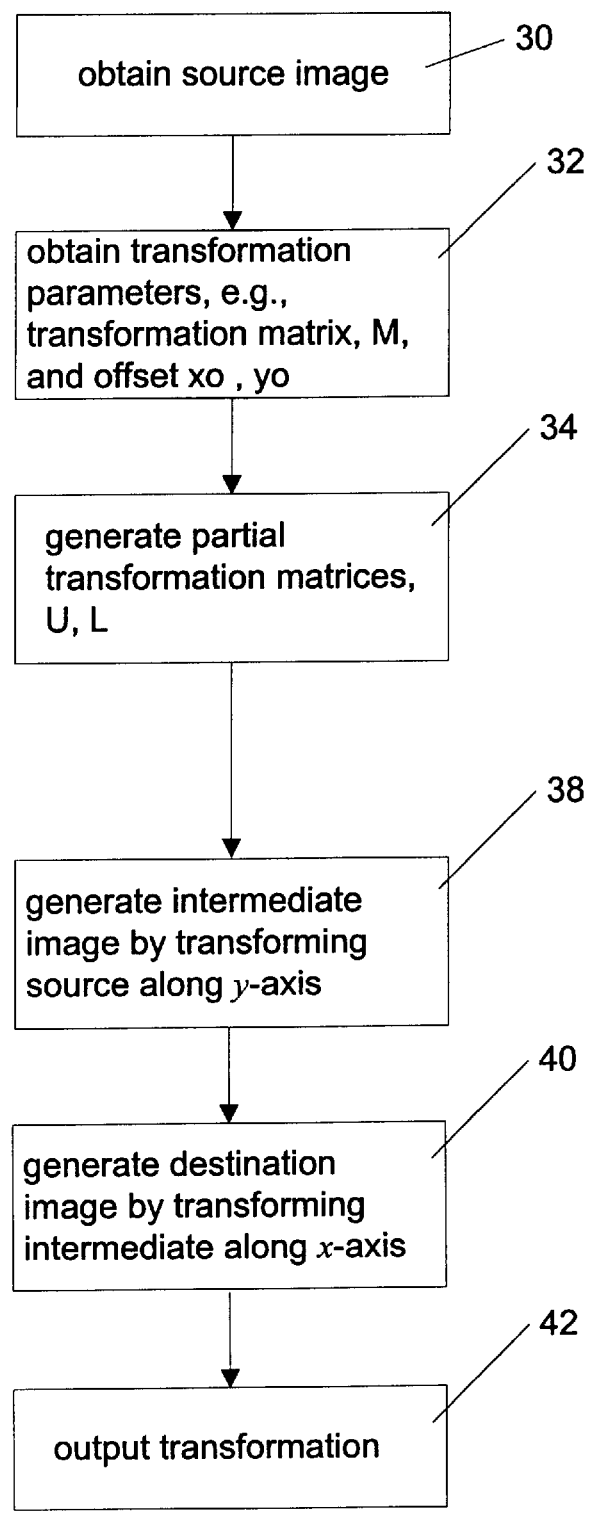
FIG. 2 depicts a method according to the invention for general affine transformation.

FIG. 2 depicts a method according to the invention for general affine transformation that overcomes this problem. Though that methodology and the discussion that follows is applicable to all practices of the invention, it is preferably applied to transformations between −45° and 45°. Variants may be employed where the rotation angle falls outside the range −45° to 45°. These variants are discussed further below.

Referring to step 30, the method obtains a source image to be transformed. This can be acquired by image capture device 16, generated by central processing unit 22, or otherwise generated or made available for processing by image analysis system 20. The source image is preferably in digital format, i.e., comprised of pixels representing intensities (e.g., color, brightness or contract) of corresponding portions of a scene.

In step 32, the method obtains parameters defining the general affine transformation to be effected on the source image by affine transformation. In the illustrated embodiment, those parameters are provided in the form of a transformation matrix, M, of the form $$\begin{bmatrix} e_{11} & e_{12} \\ e_{21} & e_{22} \end{bmatrix}$$

In the illustrated embodiment, the transformation matrix is supplied as a parameter to a function or subroutine executing on central processing units 22 that carry out the illustrated method. The matrix, or underlying parameters, may be supplied by a user, pre-programmed into the image analysis system 20, or otherwise obtained in a conventional manner.

In step 32, the method also obtains the offset, $x_o, y_o$.

In step 34, the method generates partial transformation matrices from the transformation matrix M. These partial transformation matrices are triangular matrices whose multiplicative product is equal to the matrix M. In the illustrated embodiment, these partial transformation matrices are represented by L and U, as follows $$M = L \cdot U$$

$$= \begin{bmatrix} l_{11} & 0 \\ l_{21} & l_{22} \end{bmatrix} \cdot \begin{bmatrix} u_{11} & u_{12} \\ 0 & u_{22} \end{bmatrix}$$

In the illustrated embodiment, the elements of partial transformation matrices L, U are generated in accord with the following mathematical relations:

$$l_{11} * u_{11} = e_{11}$$

$$l_{21} = l_{11} * (e_{21}/e_{11})$$

$$l_{22} * u_{22} = det(M)/e_{11}$$

$$u_{12} = u_{11} * (e_{12}/e_{11})$$

where $det(M)$ is the determinant of transformation matrix (M).

In preferred embodiments, as illustrated in the steps that follow, elements $l_{11}$ and $u_{22}$ are set to integers and, preferably, one.

In step 38, the method generates an intermediate image by affine transformation of the source image along a single axis—to wit, the y-axis—using the partial transformation matrix L, preferably, in accord with the relations:

$$\begin{bmatrix} x_s \\ y_s \end{bmatrix} = L \begin{bmatrix} x_t \\ y_t \end{bmatrix} + \begin{bmatrix} INT(x_o) \\ y_o \end{bmatrix}$$

$$= \begin{bmatrix} 1 & 0 \\ l_{21} & l_{22} \end{bmatrix} \begin{bmatrix} x_t \\ y_t \end{bmatrix} + \begin{bmatrix} INT(x_o) \\ y_o \end{bmatrix}$$

This "first pass" can be better understood by expanding the foregoing relations. With respect to the x-axis, $x_s$ varies directly with $x_t$, as shown below:

$$x_s = x_t + INT(x_o)$$

By utilizing only the integer component of the offset $x_o$, and given that $x_t$ itself takes on only integer values during generation of the intermediate image, the method insures that no interpolation is required in the x-dimension.

Whereas $x_s$ is constrained to integer values during generation of the intermediate image, $y_s$ is not. By expanding the foregoing matrix relation, it is seen that $$y_s = l_{21} x_t + l_{22} y_t + y_o$$

Since $l_{21}, l_{22}$ and $y_o$ are not necessarily integers, $y_s$ (which corresponds to integer $y_t$) is typically non-integer.

As seen above, the illustrated method defines source-to-intermediate mappings in which fractional components appear only in y-axis component—i.e., along the axis of the partial transformation. This is advantageous since it avoids the need to perform interpolations in two-dimensions (e.g., bicubic interpolations) in order to determine pixel intensifies for intermediate image.

In step 40, the illustrated method generates a final, or destination, image by affine transformation of the intermediate image along the other axis, i.e., the x-axis. The mapping for this transformation utilizes the partial transformation matrix, U, in accord with the relation:

$$\begin{bmatrix} x_t \\ y_t \end{bmatrix} = U \begin{bmatrix} x_d \\ y_d \end{bmatrix} + \begin{bmatrix} FRAC(x_o) \\ 0 \end{bmatrix}$$

$$= \begin{bmatrix} u_{11} & u_{12} \\ 0 & 1 \end{bmatrix} \begin{bmatrix} x_d \\ y_d \end{bmatrix} + \begin{bmatrix} FRAC(x_0) \\ 0 \end{bmatrix}$$

As above, transformation along the x-axis utilizing of this relation constrains values of $y_t$ to integers, while permitting $x_t$ to take on fractional components. Particularly, expanding the foregoing reveals the following relations:

$$x_t = u_{11} x_d + u_{12} y_d + FRAC(x_o)$$

$$y_t = y_d$$

In step 42, the method outputs the destination image, e.g., for use by the operator or for transfer and further processing by other machine vision tools, representing a two-dimensional affine transformation of that image.

Figure 3:
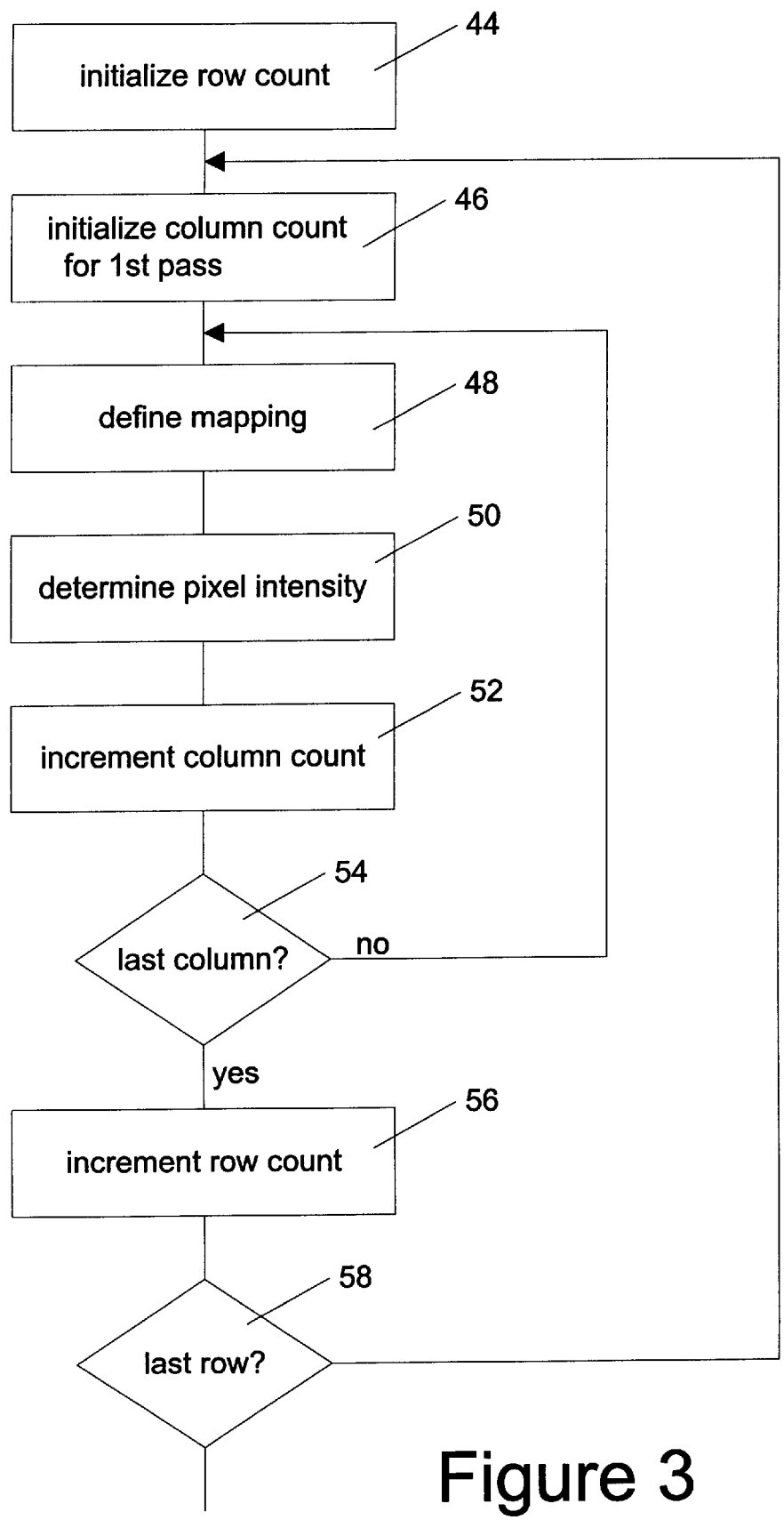
FIG. 3 depicts a method for effecting a single pass of a general affine transformation according to the invention.

FIG. 3 depicts a preferred method according to the invention for generating an intermediate image via a one-dimensional affine transformation of the source image. The illustrated method relies on iterative techniques to generate the source-to-intermediate mappings. Though use of such techniques speed processing in conventional digital data processors, those skilled in the art will appreciate that other techniques can be employed to generate such mappings, as well.

In step 44, the method initializes the intermediate image row count, (j). Preferably, this value is set to zero, as a preferred practice of the invention creates the intermediate image beginning at the coordinate location (0, 0). Those skilled in the art will, of course, appreciate that other starting coordinates for the row can be used as well.

In step 46, the method initializes the column count (i) for the current row. According to a preferred practice of the invention, this value is set at zero for each row. In a preferred embodiment, however, the method utilizes an offset that is a function of the current row number and of the transformation parameters. Use of this offset, referred to as ROWSHIFT, avoids the need to determine mapping (and pixel intensities) for portions of the intermediate image that will not be necessary for generation of the destination image. In a preferred embodiment, this offset is determined in accord with the relation:

$$ROWSHIFT\,[j]=INT(u_{11} \cdot j)$$

Other embodiments may compute this offset in accord with other relations, or use no offset at all.

In step 48, the method maps a source pixel coordinate to the current intermediate pixel coordinate (i, j). This mapping can be determined iteratively, once the mapping for intermediate pixel (0, 0) has been determined (e.g., during initialization) in accord with the elations:

$$x_s[0, 0] = x_t[0, 0] + INT(x_o)$$
$$= 0 + INT(x_o)$$
$$= INT(x_o)$$

$$y_s[0, 0] = l_{21}x_t[0, 0] + l_{22}y_t[0, 0] + (y_o)$$
$$= l_{21}*0 + l_{22}*0 + (y_o)$$
$$= (y_o)$$

Once a first source-to-intermediate mapping has been determined, e.g., for intermediate coordinate (0, 0), step 48 determines further mappings for the same row (j) iteratively, in accord with the relations:

$$x_s[i+1, j]=x_s[i, j]+1$$

$$y_s[i+1, j]=y_s[i, j]+l_{21}$$

Moreover, mappings for successive rows of the destination image can be determined iteratively as well. Thus, for example, the source coordinate that maps to the first element of such rows can be determined in accord with the relation:

$$x_s[0, j+1]=x_s[0, j]+ROWSHIFT[j]$$

$$y_s[0, j+1]=y_s[0, j]+l_{21}*ROWSHIFT[j]$$

Once a pixel coordinate location (i, j) in the intermediate image has been mapped to a coordinate $(x_s[i, j], y_s[i, j])$ in the source image, the method determines the pixel intensity for coordinate (i, j). This is preferably accomplished by interpolating pixel intensities in the vicinity of the corresponding source coordinates $(x_s[i, j], y_s[i, j])$. Though linear interpolations are preferred for high speed, those skilled in the art will appreciate that quadratic or any other higher-order interpolations may be used for greater accuracy. Of course, for quadratic and higher-order interpolations, the iterative relationships shown herein will differ accordingly.

As noted above, an advantage of methods according to the invention is that only the y-axis component of the mapped coordinate $(x_s[i, j], y_s[i, j])$ may include a fractional component. This facilitates determination of the pixel intensifies for the intermediate image since the implementation is more efficient, e.g., on superscalar processors, as discussed above.

In step 52, the method increments the column count (i) for the current row (j). This increment is usually in units of one, through other increments may be used as well. In step 54, the method determines whether the incremented count falls beyond the "useful" boundary of the intermediate image and, more particularly, in a region outside the destination affine rectangle and, therefore, that will not be necessary in generation of the destination image. In a preferred embodiment, that determination is made by comparing the incremented column count (i) with the width $W_t$ of the region of the intermediate image being transformed, where $W_t$ is computed in accord with the relation:

$$W_t = u_{11} \cdot W_d$$

If the incremented column count does not fall out of bounds, the method returns to step 48. Otherwise, it proceeds to step 56 and it increments the row count (j). In step 58, the method determines whether that count exceeds the "useful" height of the intermediate image and, more particularly, whether it falls beyond that region of the image required for generation of the destination image. That determination is made by comparing the incremented row count (j) with the height of the destination image $H_d$.

Once the intermediate image (or a portion thereof) has been generated, the illustrated method generates the destination image. This is preferably accomplished using the steps shown in FIG. 3 and discussed above—albeit by applying the aforesaid relationships defining intermediate-to-destination mappings.

Referring again to FIG. 3, a preferred method according to the invention generates the destination image via a one-dimensional affine transformation of the intermediate image. As above, the method preferably relies on iterative techniques to generate the intermediate-to-destination mappings, though other techniques can be employed as well.

In step 44, the method initializes the destination row count, (j), preferably, to zero. Again, those skilled in the art will appreciate that other starting coordinates for the row can be used as well.

In step 46, the method utilizes the column count (i) for the current row. Preferably, this value is set to zero, though other values may be used as well. Unlike the first pass (i.e., generation of the intermediate image), in the second pass the method does not utilize a row or column offset.

In step 48, the method maps an intermediate pixel coordinate to the current source fixed coordinate (i, j). This mapping can be determined iteratively, once the mapping for source pixel (0, 0) has been determined (e.g., during initialization) in accord with the relations:

$$x_t[0, 0] = u_{11}x_d[0, 0] + u_{12}y_d[0, 0] + \text{FRAC}(x_o)$$
$$= u_{11}*0 + u_{12}*0 + \text{FRAC}(x_o)$$
$$= \text{FRAC}(x_o)$$

$$y_t[0, 0] = y_d[0, 0]$$
$$= 0$$

Once a first intermediate-to-destination mapping has been determined, e.g., for destination coordinate (0, 0), step 48 determines further mappings for the same row (j) iteratively, in accord with the relations:

$$x_t[i+1, j] = x_t[i, j] + u_{11}$$

$$y_t[i+1, j] = y_t[i, j]$$

Moreover, mappings for successive rows of the destination image can be determined iteratively as well. Thus, for example, the intermediate coordinate that maps to the first element of such rows can be determined in accord with the relation:

$$x_t[0, j+1] = x_t[0, j] + u_{12}$$

$$y_t[0, j+1] = y_t[0, j] + 1$$

Once a pixel coordinate location (i, j) in the destination image has been mapped to a coordinate ($x_t[i, j]$, $y_t[i, j]$) in the intermediate image, the method determines the pixel so intensity for coordinate (i, j). This is preferably accomplished by interpolating pixel intensities in the vicinity of the corresponding intermediate coordinate ($x_t[i, j]$, $y_t[i, j]$), as discussed above.

Once again, an advantage of methods according to the invention is that only the x-axis component of the mapped coordinate ($y_t[i, j]$, $y_t[i, j]$) may include a fractional component. This facilitates determination of the pixel intensities for the intermediate image since interpolations can be determined more efficiently, e.g., on superscalar processors.

In step 52, the method increments the column count (i) for the current row (j). This increment is usually in units of one, though other increments may be used as well. In step 54, the method determines whether the incremented count falls beyond the edge of the destination image. In a preferred embodiment, that determination is made by comparing the incremented column count (i) with the width $W_d$.

If the incremented column count does not fall out of bounds, the method returns to step 48. Otherwise, it proceeds to step 56 and it increments the row count (j). In step 58, the method determines whether that count exceeds the height of the destination image. As above, that determination is made by comparing the incremented row count (j) with the expected height of the destination image $H_d$.

Figure 4:
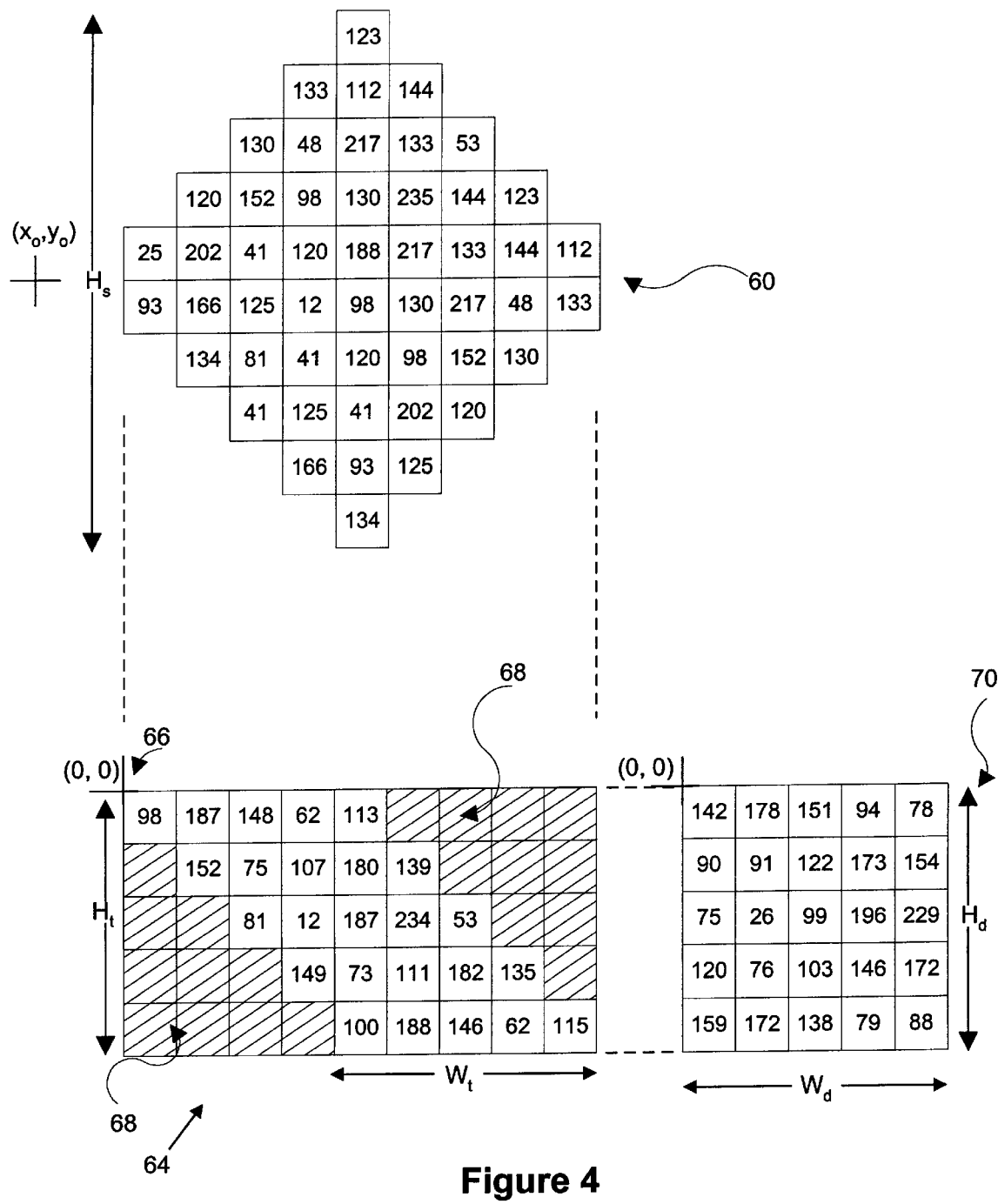
FIG. 4 graphically illustrates relationships between a source image processed by the invention and intermediate and destination images generated thereby.

FIG. 4 graphically illustrates relationships between source, intermediate and destination images in a system according to the invention. In the drawing, the source image 60 is depicted as a diamond-shaped object. The "origin" coordinate location of the source image is marked as ($x_0$, $y_0$). The height $H_s$ and width $W_s$ of a bounding box of a source affine rectangle are designated as such on the drawing.

The intermediate image generated during a first pass of steps 44–58 (FIG. 3) is shown as element 64. As a result of rotational parameters contained in the original affine in transformation matrix M and carried forward to the partial transformation matrix L, the object shape changes. Specifically, as a result of the one-dimensional affine transformation effected by the first pass, the object takes on a stepped morphology in the intermediate image. As emphasized by the drawing (which shows no scaling component) this morphological change results purely from affine transformation along one axis—to wit the y-axis.

The width and height of the transforms partially transformed object shown in the intermediate image are designated as $W_t$ and $H_t$, respectively.

The shaded areas 68 in the intermediate image represent those portions of the image corresponding to the offset ROWOFFSET, discussed above. These represent coordinate locations in the intermediate image that are not necessary generation of the destination image, again, as discussed above.

With still further reference to FIG. 4, the destination image generated as a result of the second pass, utilizing steps 44–58 (FIG. 3), is marked as element 70. Here again, the shape of the object is changed—now, as a result of transformation along the x-axis. The shape of the object in the destination image is rectangular. To emphasize the one-dimensional nature of that transformation, the height $H_d$ of the destination image is shown as being identical to that of the intermediate image. Any changes in the width $W_d$ of the object is destination image result from transformation along the x-axis.

Although the methodologies discussed above permit affine transformations for all two-dimensional transformation matrices M, the mathematical relations effected by the first pass are preferably modified where the rotation angle effected by that matrix is outside the range −45° to +45°. Particularly, to avoid excessive contraction of the intermediate image (and, therefore, degradation of the destination image), where the rotation angle falls between −45° and −135°, inclusive, the rows of the M are "swapped" to produce a modified matrix M' as shown below:

$$M = \begin{bmatrix} e_{11} & e_{12} \\ e_{21} & e_{22} \end{bmatrix}$$

$$\Downarrow$$

$$M' = \begin{bmatrix} e_{21} & e_{22} \\ e_{11} & e_{12} \end{bmatrix}$$

This effects the following change in the relationship between the source and destination coordinates:

$$\begin{bmatrix} y_s \\ x_s \end{bmatrix} = \begin{bmatrix} e_{21} & e_{22} \\ e_{11} & e_{12} \end{bmatrix} \begin{bmatrix} x_d \\ y_d \end{bmatrix} + \begin{bmatrix} y_o \\ x_o \end{bmatrix}$$

By substitution, the relations underlying the first pass may be restated as follows:

$$\begin{bmatrix} y_s \\ x_s \end{bmatrix} = \begin{bmatrix} 1 & 0 \\ l_{21} & l_{22} \end{bmatrix} \begin{bmatrix} x_t \\ y_t \end{bmatrix} + \begin{bmatrix} y_o \\ \text{INT}(x_o) \end{bmatrix}$$

Thus, the iterative expressions for that pass may be restated as:

$$x_s[i+1, j] = x_s[i, j] + l_{21}$$

$$y_s[i+1, j] = y_s[i, j] + \text{srcPitch}$$

where srcPitch is the "pitch" or width of the source image.

The methodology is also preferably modified where the rotation angle effected by M is between 45 and 135 degrees, or between 135 and 225 degrees. For these cases $u_{11}$ element of the right triangular matrix is negative. This leads to negative coordinates of the intermediate image. To avoid this the sign of $l_{11}$ element of the left triangular matrix is changed ($l_{11}$ is −1 now). This results in $u_{11}$ changing its sign, because $l_{11}*u_{11}=e_{11}$. As with the previous cases only 1st pass is changed. The recursive expressions for the case when rotation angle is between 135 and 225 degrees are:

$$x_s[i+1, j]=x_s[i, j]-1$$

$$y_s[i+1, j]=y_s[i, j]+l_{21}$$

and if rotation angle is between 45 and 135 degrees $$x_s[i+1, j]=x_s[i, j]+l_{21}$$

$$y_s[i+1, j]=y_s[i, j]-srcPitch$$

The minus sign in both cases indicates the fact that the directions of the change of corresponding coordinates are opposite for the source and intermediate images. In the second case the rows of the original transformation matrix were swapped to reduce intermediate image contraction. The fact that the second pass does not change with angle simplifies modifications (for example, projections) of the algorithm.

Figure 5:
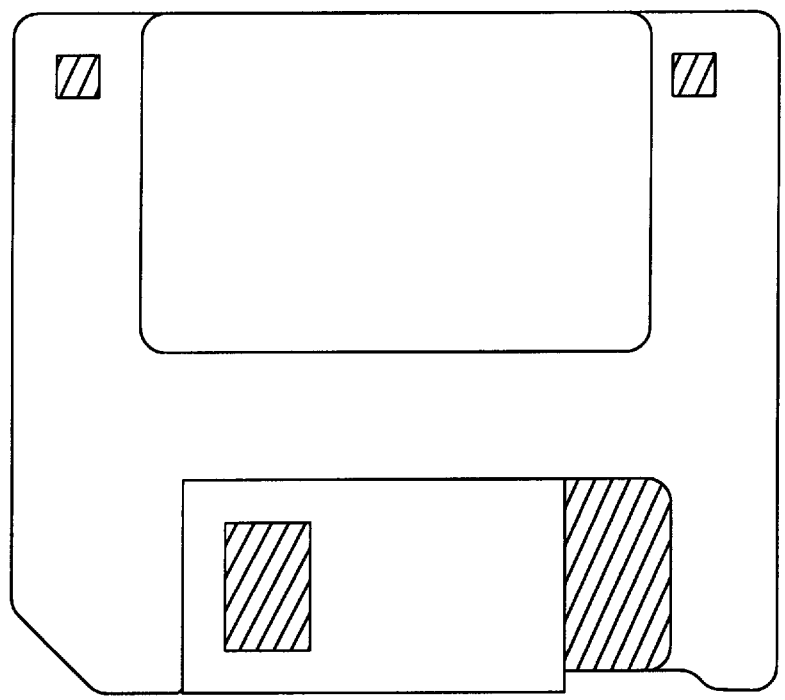
FIG. 5 depicts a computer readable medium containing programming instructions for configuring a digital data processor to practice the invention.
Figure 5:
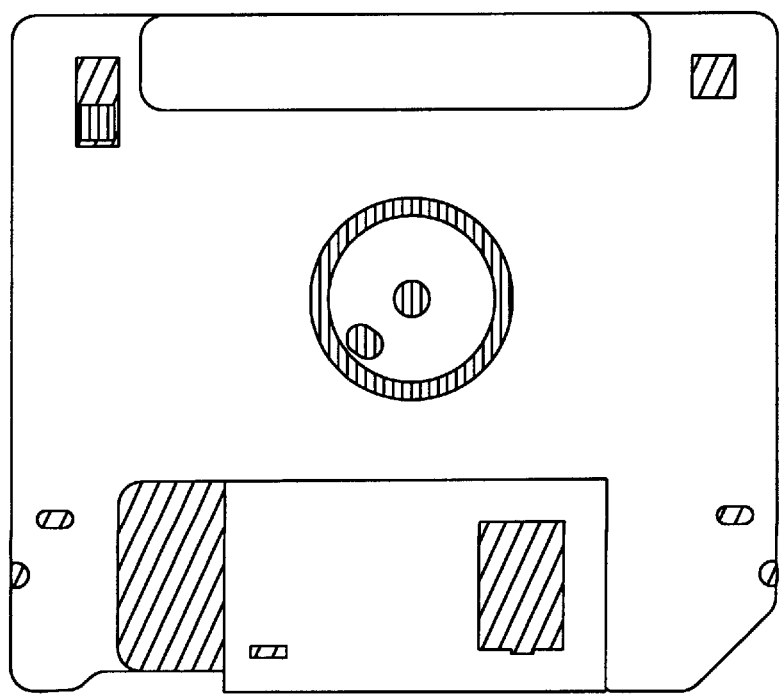

FIG. 5 depicts an article of manufacture, to wit, a magnetic diskette, composed of a computer usable media, to wit, a magnetic disk, embodying a computer program that causes device 20, or other such digital data processing apparatus, to operate in accord with the methods described above in connection with FIGS. 1–4. The diskette is shown in front view and back view. It is of conventional construction and has the computer program stored on the magnetic media therein in a conventional manner readable, e.g., via a read/write head contained in a diskette drive 28 of apparatus 20. It will be appreciated that diskette is shown by way of example only and that other articles of manufacture comprising computer usable media on which programs intended to cause a computer to execute in accord with the teachings hereof are also embraced by the invention.

Described above are methods and apparatus that achieve the objects set forth above. Those skilled in the art will appreciate that the illustrated embodiments are shown as examples and that other embodiments incorporating changes therein fall within the scope of the invention. Thus, for example, it will be appreciated that the invention has application in all aspects of image processing, e.g., machine vision, medical imaging, digital photography and so forth.

In view thereof, what I claim is:

1. An image processing method of general, separable affine transformation of a source image, the method comprising the steps of
A. generating an intermediate image by affine transformation of the source image along a first axis relative to the source image in accord with a partial transformation matrix L, wherein the partial transformation matrix L is a left triangular matrix;
B. generating a destination image by affine transformation of the intermediate image along a second axis relative to the source image in accord with a partial transformation matrix U, wherein the partial transformation U is a right triangular matrix;
C. where coordinates in the source image are related to coordinates in the destination image in accord with the relations:

$$\begin{bmatrix} x_s \\ y_s \end{bmatrix} = M \begin{bmatrix} x_d \\ y_d \end{bmatrix} + \begin{bmatrix} x_0 \\ y_0 \end{bmatrix}$$

$$M = \begin{bmatrix} e_{11} & e_{12} \\ e_{21} & e_{22} \end{bmatrix}$$

where
  ($x_d,y_d$) represents a coordinate in the destination image;
  ($x_s,y_s$) represents a coordinate in the source image;
  ($x_0,y_0$) is an offset to be effected by the transformation;
  $e_{11}$, $e_{12}$, $e_{21}$, and $e_{22}$ are elements of a general affine transformation matrix M; and
D. where L and U are decompositions of the transformation matrix M, such that M=L·U and
  where the destination image represents a general affine transformation of the source image.

2. A method according to claim 1, wherein step (A) comprises
  i. defining a mapping between coordinates in the intermediate image and those in the source image; and
  ii. determining a pixel intensity for at least a selected coordinate in the intermediate image as a function of intensities of one or more pixels in a vicinity of a coordinate in the source image to which the selected coordinate maps.

3. A method according to claim 2, wherein step (A)(i) comprises defining a mapping between locations in the intermediate image having two integer coordinates and those in the source image having at least one integer coordinate.

4. A method according to claim 2, wherein step (A)(ii) comprises determining a pixel intensity for the selected coordinate in the intermediate image by any of interpolation and extrapolation of the intensities of one or more pixels in the vicinity of the coordinate in the source image to which the selected coordinate maps.

5. A method according to claim 1, wherein step (B) comprises
  i. defining a mapping between coordinates in the destination image and those in the intermediate image; and
  ii. determining a pixel intensity for at least a selected coordinate in the destination image as a function of intensities of one or more pixels in a vicinity of a coordinate in the intermediate image to which the selected coordinate maps.

6. A method according to claim 5, wherein step (B)(i) comprises defining a mapping between locations in the destination image having two integer coordinates and those in the source image having at least one integer coordinate.

7. A method according to claim 5, wherein step (B)(ii) comprises determining a pixel intensity for the selected coordinate in the destination image by any of interpolation and extrapolation of the intensities of one or more pixels in the vicinity of the coordinate in the intermediate image to which the selected coordinate maps.

8. A method according to claim 1, wherein the first axis and the second axis are substantially perpendicular to one another.

9. A method according to claim 1, wherein the partial transformation matrix L is in accord with the relation $$L = \begin{bmatrix} l_{11} & 0 \\ l_{21} & l_{22} \end{bmatrix}$$

wherein $l_{11}$, $l_{21}$ and $l_{22}$ are parameters of L and wherein $l_{11}$=1.

10. A method according to claim 1, wherein the partial transformation matrix U is in accord with the relation $$U = \begin{bmatrix} u_{11} & u_{12} \\ 0 & u_{22} \end{bmatrix}$$

wherein $u_{11}$, $u_{12}$ and $u_{22}$ are parameters of U and wherein $u_{22}=1$.

11. An image processing method for general, separable affine transformation of a source image, the method comprising the steps of A. generating an intermediate image by affine transformation of the source image along a first axis, such generating step including
  i. defining a mapping between coordinates in the intermediate image and coordinates in the source image, wherein said step of defining the mapping includes the steps of (1) selecting a plurality of coordinates for the intermediate image and (2) calculating for each of those selected coordinates a corresponding coordinate in the source image,
  ii. determining a pixel intensity for at least a selected coordinate in the intermediate image as a function of intensities of one or more pixels in a vicinity of a coordinate in the source image to which the selected coordinate maps, B. generating a destination image by affine transformation of the intermediate image along a second axis, such generating step including
  i. defining a mapping between coordinates in the destination image and those in the intermediate image in accord with the relations $x_t[i+1, j] = x_t[i, j] + u_{11}$ $y_t[i+1, j] = y_t[i, j]$ where
    $x_t[i, j]$ and $y_t[i, j]$ are coordinates of a location in the intermediate image that map to a coordinate (i, j) in the destination image; and
    $x_t[i+1, j]$ and $y_t[i+1, j]$ are coordinates of a successive location in the intermediate image that maps to a coordinate (i+1, j) in the destination image; and
  ii. determining a pixel intensity for at least a selected coordinate in the destination image as a function of intensities of one or more pixels in a vicinity of a coordinate in the intermediate image to which the selected coordinate maps.

12. A method according to claim 11, wherein
step (A)(i) comprises defining a mapping between locations in the intermediate image having two integer coordinates and those in the source image having at least one integer coordinate, and
step (B)(i) comprises defining a mapping between locations in the destination image having two integer coordinates and those in the source image having at least one integer coordinate.

13. A method according to claim 11, wherein the defining step comprises determining mappings between coordinates in the source image and those of the intermediate image in accord with the relations $x_s[i+1, j] = x_s[i, j] + 1$ $y_s[i+1, j] = y_s[i, j] + l_{21}$ where
  $x_s[i, j]$ and $y_s[i, j]$ are coordinates of a location in the source image that maps to a coordinate (i, j) in the intermediate image; and
  $x_s[i+1, j]$ and $y_s[i+1, j]$ are coordinates of a location in the source image that maps to a coordinate (i+1, j) in the intermediate image.

14. A method according to claim 11, wherein the defining step comprises determining mappings between coordinates in the source image and those of the intermediate image in accord with the relations $x_s[i+1, j] = x_s[i, j] - 1$ $y_s[i+1, j] = y_s[i, j] + l_{21}$ where
  $x_s[i, j]$ and $y_s[i, j]$ are coordinates of a location in the source image that maps to a coordinate (i, j) in the intermediate image; and
  $x_s[i+1, j]$ and $y_s[i+1, j]$ are coordinates of a location in the source image that maps to a coordinate (i+1, j) in the intermediate image.

15. A method according to claim 11, wherein the defining step comprises determining mappings between coordinates in the source image and those of the intermediate image in accord with the relations $x_s[i+1, j] = x_s[i, j] + l_{21}$ $y_s[i+1, j] = y_s[i, j] + srcPitch$ where
  $x_s[i, j]$ and $y_s[i, j]$ are coordinates of a location in the source image that maps to a coordinate (i, j) in the intermediate image,
  $x_s[i+1, j]$ and $y_s[i+1, j]$ are coordinates of a location in the source image that maps to a coordinate (i+1, j) in the intermediate image; and
  srcPitch is a width of the source image.

16. A method according to claim 11, wherein the defining step comprises determining mappings between coordinates in the source image and those of the intermediate image in accord with the relations $x_s[i+1, j] = x_s[i, j] + l_{21}$ $y_s[i+1, j] = y_s[i, j] - srcPitch$ where
  $x_s[i, j]$ and $y_s[i, j]$ are coordinates of a location in the source image that maps to a coordinate (i, j) in the intermediate image;
  $x_s[i+1, j]$ and $y_s[i+1, j]$ are coordinates of a location in the source image that maps to a coordinate (i+1, j) in the intermediate image; and
  srcPitch is a width of the source image.

17. An image processing system for carrying out a method for general, separable affine transformation of a source image, the method comprising the steps of A. generating an intermediate image by affine transformation of the source image along a first axis relative to the source image in accord with partial transformation matrix L, wherein the partial transformation matrix L is a left triangular matrix, and B. generating a destination image by affine transformation of the intermediate image along a second axis relative to the source image in accord with a partial transformation matrix U, wherein the partial transformation matrix U is a right triangular matrix;

C. where coordinates in the source image are related to coordinates in the destination image in accord with the relations:

$$\begin{bmatrix} x_s \\ y_s \end{bmatrix} = M \cdot \begin{bmatrix} x_d \\ y_d \end{bmatrix} + \begin{bmatrix} x_o \\ y_o \end{bmatrix}$$

$$M = \begin{bmatrix} e_{11} & e_{12} \\ e_{21} & e_{22} \end{bmatrix}$$

where
- $(x_d, y_d)$ represents a coordinate in the destination image;
- $(x_s, y_s)$ represents a coordinate in the source image;
- $(x_o, y_o)$ is an offset to be effected by the transformation;
- $e_{11}, e_{12}, e_{21},$ and $e_{22}$ are elements of a general affine transformation matrix M, and D. where L and U are decompositions of a transformation matrix M, such that $M = L \cdot U$, and
where the destination image represents a general affine transformation of the source image.

18. A system according to claim 17, wherein step (A) comprises
   i. defining a mapping between coordinates in the intermediate image and those in the source image; and
   ii. determining a pixel intensity for at least a selected coordinate in the intermediate image as a function of intensities of one or more pixels in a vicinity of a coordinate in the source image to which the selected coordinate maps.

19. A system according to claim 18, wherein step (A)(i) comprises defining a mapping between locations in the intermediate image having two integer coordinates and those in the source image having at least one integer coordinate.

20. A system according to claim 18, wherein step (A)(ii) comprises determining a pixel intensity for the selected coordinate in the intermediate image by any of interpolation and extrapolation of the intensities of one or more pixels in the vicinity of the coordinate in the source image to which the selected coordinate maps.

21. A system according to claim 17, wherein step (B) comprises
   i. defining a mapping between coordinates in the destination image and those in the intermediate image; and
   ii. determining a pixel intensity for at least a selected coordinate in the destination image as a function of intensities of one or more pixels in a vicinity of a coordinate in the intermediate image to which the selected coordinate maps.

22. A system according to claim 21, wherein step (B)(i) comprises defining a mapping between locations in the destination image having two integer coordinates and those in the source image having at least one integer coordinate.

23. A system according to claim 21, wherein step (B)(ii) comprises determining a pixel intensity for the selected coordinate in the destination image by any of interpolation and extrapolation of the intensities of one or more pixels in the vicinity of the coordinate in the intermediate image to which the selected coordinate maps.

24. A system according to claim 17, wherein the first axis and the second axis are substantially perpendicular to one another.

25. A system according to claim 24, wherein the first axis and the second axis are substantially aligned with respective axes of the destination image.

26. A system according to claim 17, wherein the partial transformation matrix L is in accord with the relation $$L = \begin{bmatrix} l_{11} & 0 \\ l_{21} & l_{22} \end{bmatrix}$$

wherein $l_{11}, l_{21}$ and $l_{22}$ are parameters of L and wherein $l_{11}=1$.

27. A system according to claim 17, wherein the partial transformation matrix U is in accord with the relation $$U = \begin{bmatrix} u_{11} & u_{12} \\ 0 & u_{22} \end{bmatrix}$$

wherein $u_{11}, u_{12}$ and $u_{22}$ are parameters of U and wherein $u_{22}=1$.

28. An image processing system for carrying out a method for general, separable affine transformation of a source image, the method comprising the steps of
A. generating an intermediate image by affine transformation of the source image along a first axis, such generating step including
   i. defining a mapping between coordinates in the intermediate image and those in the source image, wherein said step of defining the mapping includes the steps of (1) selecting a plurality of coordinates for the intermediate image and (2) calculating for each of those selected coordinates a corresponding coordinate in the source image; and
   ii. determining a pixel intensity for at least a selected coordinate in the intermediate image as a function of intensities of one or more pixels in a vicinity of a coordinate in the source image to which the selected coordinate maps,
B. generating a destination image by affine transformation of the intermediate image along a second axis, such generating step including
   i. defining a mapping between coordinates in the destination image and those in the intermediate image in accord with the relations $x_t[i+1, j] = x_t[i, j] + u_{11}$ $y_t[i+1, j] = y_t[i, j]$ where
- $x_t[i, j]$ and $y_t[i, j]$ are coordinates of a location in the intermediate image that map to a coordinate $(i, j)$ in the destination image; and
- $x_t[i+1, j]$ and $y_t[i+1, j]$ are coordinates of a successive location in the intermediate image that maps to a coordinate $(i+1, j)$ in the destination image; and
   ii. determining a pixel intensity for at least a selected coordinate in the destination image as a function of intensities of one or more pixels in a vicinity of a coordinate in the intermediate image to which the selected coordinate maps.

29. A system according to claim 28, wherein
step (A)(i) comprises defining a mapping between locations in the intermediate image having two integer coordinates and those in the source image having at least one integer coordinate, and
step (B)(i) comprises defining a mapping between locations in the destination image having two integer coordinates and those in the source image having at least one integer coordinate.

30. A system according to claim 28, wherein the defining step comprises determining mappings between coordinates in the source image and those of the intermediate image in accord with the relations $$x_s[i+1, j] = x_s[i, j]+1$$

$$y_s[i+1, j] = y_s[i, j]+l_{21}$$

where
- $x_s[i, j]$ and $y_s[i, j]$ are coordinates of a location in the source image that maps to a coordinate (i, j) in the intermediate image; and
- $x_s[i+1, j]$ and $y_s[i+1, j]$ are coordinates of a location in the source image that maps to a coordinate (i+1, j) in the intermediate image.

31. A system according to claim 28, wherein the defining step comprises determining mappings between coordinates in the source image and those of the intermediate image in accord with the relations $$x_s[i+1, j] = x_s[i, j]-1$$

$$y_s[i+1, j] = y_s[i, j]+l_{21}$$

where
- $x_s[i, j]$ and $y_s[i, j]$ are coordinates of a location in the source image that maps to a coordinate (i, j) in the intermediate image; and
- $x_s[i+1, j]$ and $y_s[i+1, j]$ are coordinates of a location in the source image that maps to a coordinate (i+1, j) in the intermediate image.

32. A system according to claim 28, wherein the defining step comprises determining mappings between coordinates in the source image and those of the intermediate image in accord with the relations $$x_s[i+1, j] = x_s[i, j]+l_{21}$$

$$y_s[i+1, j] = y_s[i, j]+srcPitch$$

where
- $x_s[i, j]$ and $y_s[i, j]$ are coordinates of a location in the source image that maps to a coordinate (i, j) in the intermediate image;
- $x_s[i+1, j]$ and $y_s[i+1, j]$ are coordinates of a location in the source image that maps to a coordinate (i+1, j) in the intermediate image; and
- srcPitch is a width of the source image.

33. A system according to claim 28, wherein the defining step comprises determining mappings between coordinates in the source image and those of the intermediate image in accord with the relations $$x_s[i+1, j] = x_s[i, j]+l_{21}$$

$$y_s[i+1, j] = y_s[i, j]-srcPitch$$

where
- $x_s[i, j]$ and $y_s[i, j]$ are coordinates of a location in the source image that maps to a coordinate (i, j) in the intermediate image;
- $x_s[i+1, j]$ and $y_s[i+1, j]$ are coordinates of a location in the source image that maps to a coordinate (i+1, j) in the intermediate image; and
- srcPitch is a width of the source image.

34. An image processing method for general, separable affine transformation of a source image, the method comprising the steps of A. generating an intermediate image by affine transformation of the source image along a first axis, such generating step including
  i. defining a mapping between coordinates in the intermediate image and those in the source image in accord with the relations $$x_s[i+1, j] = x_s[i, j]+1$$

$$y_s[i+1, j] = y_s[i, j]+l_{21}$$

where
  - $x_s[i, j]$ and $y_s[i, j]$ are coordinates of a location in the source image that maps to a coordinate (i, j) in the intermediate image; and
  - $x_s[i+1, j]$ and $y_s[i+1, j]$ are coordinates of a location in the source image that maps to a coordinate (i+1 j) in the intermediate image; and ii. determining a pixel intensity for at least a selected coordinate in the intermediate image as a function of intensities of one or more pixels in a vicinity of a coordinate in the source image to which the selected coordinate maps, B. generating a destination image by affine transformation of the intermediate image along a second axis, such generating step including
  i. defining a mapping between coordinates in the destination image and those in the intermediate image, wherein said step of defining the mapping includes the steps of (1) selecting a plurality of coordinates for the destination image and (2) calculating for each of those selected coordinates a corresponding coordinate in the intermediate image; and
  ii. determining a pixel intensity for at least a selected coordinate in the destination image as a function of intensities of one or more pixels in a vicinity of a coordinate in the intermediate image to which the selected coordinate maps.

35. A method according to claim 34, wherein
step (A)(i) comprises defining a mapping between locations in the intermediate image having two integer coordinates and those in the source image having at least one integer coordinate, and
step (B)(i) comprises defining a mapping between locations in the destination image having two integer coordinates and those in the source image having at least one integer coordinate.

36. A method according to claim 34, wherein defining step (B)(i) comprises determining mappings between coordinates in the intermediate image and those of the destination image in accord with the relations $$x_I[i+1, j] = x_I[i, j]+u_{11}$$

$$y_I[i+1, j] = y_I[i, j]$$

where
- $x_I[i, j]$ and $y_I[i, j]$ are coordinates of a location in the intermediate image that map to a coordinate (i, j) in the destination image; and
- $x_I[i+1, j]$ and $y_I[i+1, j]$ are coordinates of a successive location in the intermediate image that maps to a coordinate (i+1, j) in the destination image.

37. An image processing system for carrying out a method for general, separable affine transformation of a source image, the method comprising the steps of A. generating an intermediate image by affine transformation of the source image along a first axis, such generating step including i. defining a mapping between coordinates in the intermediate image and those in the source image in accord with the relations $$x_s[i+1, j] = x_s[i, j] + 1$$

$$y_s[i+1, j] = y_s[i, j] + l_{21}$$

where $x_s[i, j]$ and $y_s[i, j]$ are coordinates of a location in the source image that maps to a coordinate (i, j) in the intermediate image; and $x_s[i+1, j]$ and $y_s[i+1, j]$ are coordinates of a location in the source image that maps to a coordinate (i+1, j) in the intermediate image; and ii. determining a pixel intensity for at least a selected coordinate in the intermediate image as a function of intensities of one or more pixels in a vicinity of a coordinate in the source image to which the selected coordinate maps, B. generating a destination image by affine transformation of the intermediate image along a second axis, such generating step including i. defining a mapping between coordinates in the destination image and those in the intermediate image; wherein said step of defining the mapping includes the steps of (1) selecting a plurality of coordinates for the destination image, and (2) calculating for each of those selected coordinates a corresponding coordinate in the intermediate image;

ii. determining a pixel intensity for at least a selected coordinate in the destination image as a function of intensities of one or more pixels in a vicinity of a coordinate in the intermediate image to which the selected coordinate maps.

38. A system according to claim 37, wherein step (A)(i) comprises defining a mapping between locations in the intermediate image having two integer coordinates and those in the source image having at least one integer coordinate, and step (B)(i) comprises defining a mapping between locations in the destination image having two integer coordinates and those in the source image having at least one integer coordinate.

39. A system according to claim 37, wherein defining step (B)(i) comprises determining mappings between coordinates in the intermediate image and those of the destination image in accord with the relations $$x_t[i+1, j] = x_t[i, j] + u_{11}$$

$$y_t[i+1, j] = y_t[i, j]$$

where $x_t[i, j]$ and $y_t[i, j]$ are coordinates of a location in the intermediate image that map to a coordinate (i, j) in the destination image; and $x_t[i+1, j]$ and $y_t[i+1, j]$ are coordinates of a successive location in the intermediate image that maps to a coordinate (i+1, j) in the destination image.

* * * * *